US006456715B1

(12) United States Patent
Kennedy

(10) Patent No.: US 6,456,715 B1
(45) Date of Patent: Sep. 24, 2002

(54) CONNECTING A TELEPHONE

(75) Inventor: Richard H. Kennedy, Houston, TX (US)

(73) Assignee: Compaq Information Technologies Group, L.P., Houston, TX (US)

( * ) Notice: Subject to any disclaimer, the term of this patent is extended or adjusted under 35 U.S.C. 154(b) by 0 days.

(21) Appl. No.: 08/939,688

(22) Filed: Sep. 29, 1997

(51) Int. Cl.[7] .......................... H04M 1/00; H04M 9/00; H04M 9/02; H04M 11/00
(52) U.S. Cl. ................. 379/442; 379/93.05; 379/93.09; 379/93.34; 379/102.01; 379/142.18; 379/168; 379/352; 379/399.01
(58) Field of Search ........................ 379/93.05, 93.09, 379/442, 90.01, 93.01, 96, 93.11, 377, 399, 88.18, 88.22, 88.23, 88.24, 88.25, 88.27, 352, 102.01, 102.02, 399.01, 399.02, 93.34, 142.18, 168; 340/426

(56) References Cited

U.S. PATENT DOCUMENTS

| | | | | |
|---|---|---|---|---|
| 5,189,693 A | * | 2/1993 | Nakajima | 379/102.02 |
| 5,493,609 A | * | 2/1996 | Winseck, Jr. et al. | 379/96 |
| 5,546,448 A | * | 8/1996 | Caswell et al. | 379/142 |
| 5,557,254 A | * | 9/1996 | Johnson et al. | 340/426 |
| 5,625,679 A | * | 4/1997 | Gutzmer | 379/442 |
| 5,696,600 A | * | 12/1997 | Perkins | 379/93.34 X |
| 5,790,656 A | * | 8/1998 | Rahamim et al. | 379/399 |
| 5,850,436 A | * | 12/1998 | Rosen et al. | 379/377 |
| 6,160,873 A | * | 12/2000 | Truong et al. | 379/102.02 |

OTHER PUBLICATIONS

Octel, "User Reference Manual", version 2, entire document, Nov. 1994.*

* cited by examiner

Primary Examiner—Harry S. Hong
(74) Attorney, Agent, or Firm—Akin, Gump, Strauss, Hauer & Feld, LLP

(57) ABSTRACT

A computer system is used with a telephone that is operable by a user to furnish a predetermined command. The processing unit and a control circuit. The central processing unit is connected to communicate with the interface port, and the control circuit is connected to the telephone. The control circuit is configured to detect the predetermined command and in response to detection of the predetermined command, change a connection status between the telephone and the interface port.

57 Claims, 7 Drawing Sheets

CONNECTING A TELEPHONE

BACKGROUND

The invention relates to connecting a telephone.

Referring to FIG. 1, a typical computer 9 (e.g., a desktop or portable computer) has a modem 2 for establishing communication between the computer 9 and another telephone line device over a telephone line 6. This telephone line device might be the modem of another computer or a telephone.

Quite often, the end of the telephone line 6 near the computer 9 includes a short segment 6a that extends from a wall-mounted telephone jack 1 to the computer 9. The telephone line segment 6a typically has one connector (e.g., an RJ-11 connector) that is constructed to plug into the jack 1 and one connector that is constructed to plug into either the modem 2 or a telephone 3. In recognition that both the telephone 3 and the modem 2 typically need to be connected to the telephone line segment 6a, the modem 2 typically has two RJ-11 telephone jacks 5. In this manner, the telephone line segment 6a is plugged into one of the jacks 5, and the telephone 3 is plugged into the other jack 5.

For the telephone 3 to access the telephone line 6, the jacks 5 of the modem are electrically connected together. One way to accomplish this is to hardwire the jacks 5 of the modem 2 together (See FIG. 2). However, referring to FIG. 3, another modem 7 might have circuitry 7a to selectively connect the jacks 5 together based on when the modem 7 needs access to the telephone line 6.

Typically, only one telephone line device (i.e., the modem 7 or the telephone 3) may use the telephone line 6 to the mutual exclusion of other telephone line devices. For example, when the modem 7 goes off-hook, or seizes the telephone line 6, the modem 7 disconnects the telephone 3 from the telephone line 6. In certain telephony modes, when the telephone 3 goes off-hook, the modem 7 may disconnect itself from the telephone line 6 and connect the telephone 3 to the telephone line 6. These telephony modes include a telephone answering machine mode which permits a user of the telephone 3 to pick up the telephone 3 to stop recording of an incoming call, and thus, speak to the calling party.

Referring to back to FIG. 1, besides being used to access the telephone line 6, the telephone 3 may also be used as a peripheral device of the computer 9. The computer 9 might have an analog port 11 with an RJ-11 telephone jack 5 for connecting the modem 9 to the computer 9. As a peripheral device, the telephone 3 might, for example, be used to select items of a menu-driven software program and retrieve stored voicemail messages from the computer 9.

SUMMARY

In general, in one aspect, the invention features a computer system that is used with a telephone. The telephone is operable by a user to furnish a predetermined command. The computer system has a telephony interface port, a central processing unit and a control circuit. The central processing unit is connected to communicate with the interface port, and the control circuit is connected to the telephone. The control circuit is configured to detect the predetermined command and in response to detection of the predetermined command, change a connection status between the telephone and the interface port.

Implementations of the invention may include one or more of the following. The control circuit may he configured to change the connection status by connecting the telephone to the interface port. The control circuit may also be configured, in response to detection of the predetermined command, to change another connection status between the telephone and a telephone line. The control circuit may be configured to change this other connection status between the telephone and the telephone line by disconnecting the telephone from the telephone line.

The central processing unit may also be connected to communicate with the interface port to detect another predetermined command furnished by the user via the telephone. The central processing unit may also be connected to communicate with the control circuit to change the connection status between the telephone and the interface port in response to detection of the other predetermined command. The control circuit may be configured to change the connection status in response to the other predetermined command by disconnecting the telephone from the interface port.

The telephone may include a key pad, and the predetermined command may include a dial tone generated by the telephone in response to a predetermined key of the key pad being pressed. The predetermined command may include a dial tone generated by the telephone in response to the user speaking into the telephone.

The telephone may be configured to generate a signal indicative of the predetermined command, and the control circuit may include a switch circuit, a discrete signal processing engine and a controller. The switch circuit may be connected to the telephone and the interface port. The discrete signal processing engine may be configured to recognize the predetermined signal, and the controller may be configured to use the switch circuit to connect the telephone to the interface port in response to recognition of the predetermined signal by the engine. The engine and controller may be part of a modem, and at least a portion of the control circuit may be part of a modem.

In general, in another aspect, the invention features a system for use with a telephone. The telephone is operable by a user to furnish a predetermined command. The system includes a computer and a control circuit. The computer has a communication port, and the control circuit is connected to the telephone. The control circuit is configured to detect the predetermined command and in response to detection of the predetermined command, change a connection status between the telephone and the port.

In general, in another aspect, the invention features a method for use with a computer and a telephone. The telephone is capable of operation by a user to furnish a predetermined command. The method includes detecting the predetermined command and in response to detection of the predetermined command, changing a connection status between the telephone and the computer.

In general, in another aspect, the invention features a computer system for use with a telephone that is operable by a user to furnish a predetermined command. The computer system includes a modem that is configured to detect the predetermined command and operate in response to detection of the predetermined command. The computer system also has a central processing unit that is configured to interact with the modem.

Implementations of the invention may include one or more of the following. The modem may be configured to detect the command by using a caller ID function of the modem. The modem may be configured to operate by changing a connection status of the telephone.

In general, in another aspect, the invention features a computer system for use with a telephone that is operable by a user to furnish a predetermined command. The computer system includes a modem that has a caller ID function. The modem is configured to use the caller ID function to detect the predetermined command. The computer system also has a central processing unit that is configured to interact with the modem.

In general, in another aspect, the invention features a method for use with a computer system and a telephone that is operable by a user to furnish a predetermined command. The method includes using a modem to detect the predetermined command and operating the modem in response to detection of the predetermined command.

In general, in another aspect, the invention features a method for use with a computer system and a telephone that is operable by a user to furnish a predetermined command. The method includes using a caller ID function of the modem to detect the predetermined command.

Among the advantages of the invention are one or more of the following. Neither use of a keyboard of the computer nor physical connection/disconnection of telephone lines are required. A wireless phone may be used to control the computer. Only use of the telephone is required to retrieve stored voicemail messages from the computer. Some pre-existing circuitry and functions (e.g., caller ID circuitry) of the modem may be used. Minimal circuit space is consumed.

Other advantages and features will become apparent from the following description and from the claims.

DESCRIPTION

Figure 1:
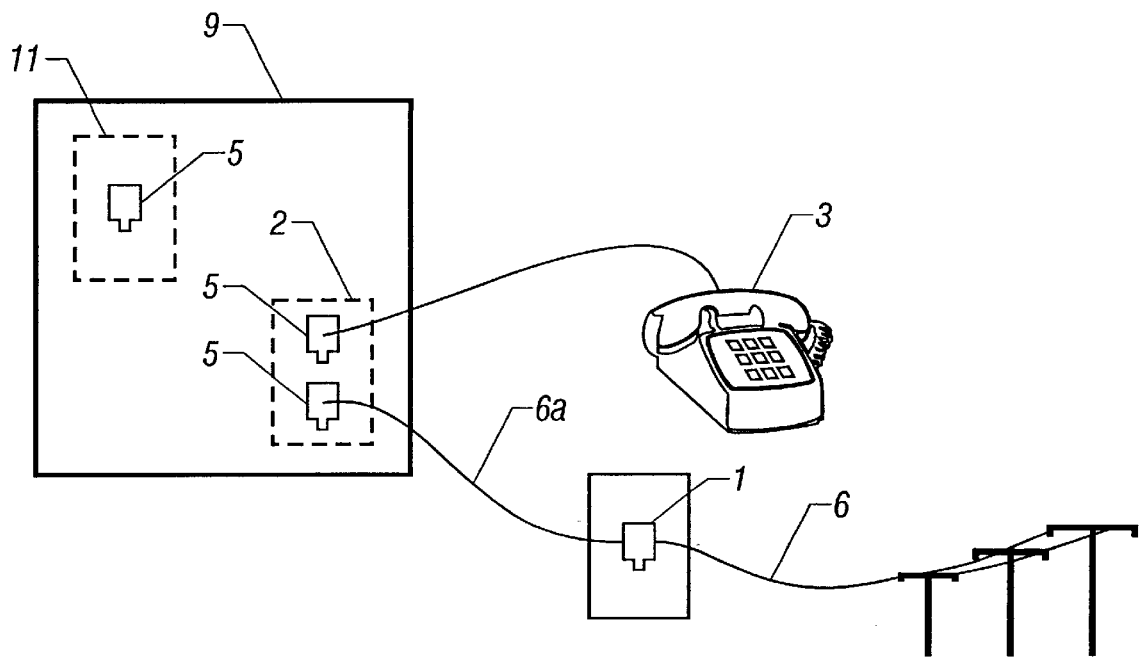
FIG. 1 is an electrical schematic diagram of a computer system of the prior art.
Figure 2:
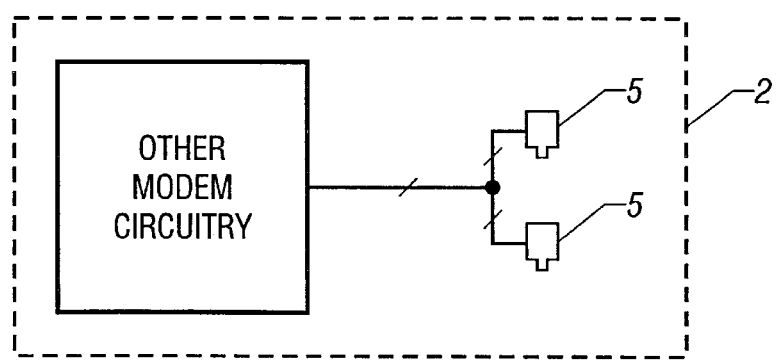
FIGS. 2 and 3 are electrical schematic diagrams of modems of the prior art.
Figure 3:
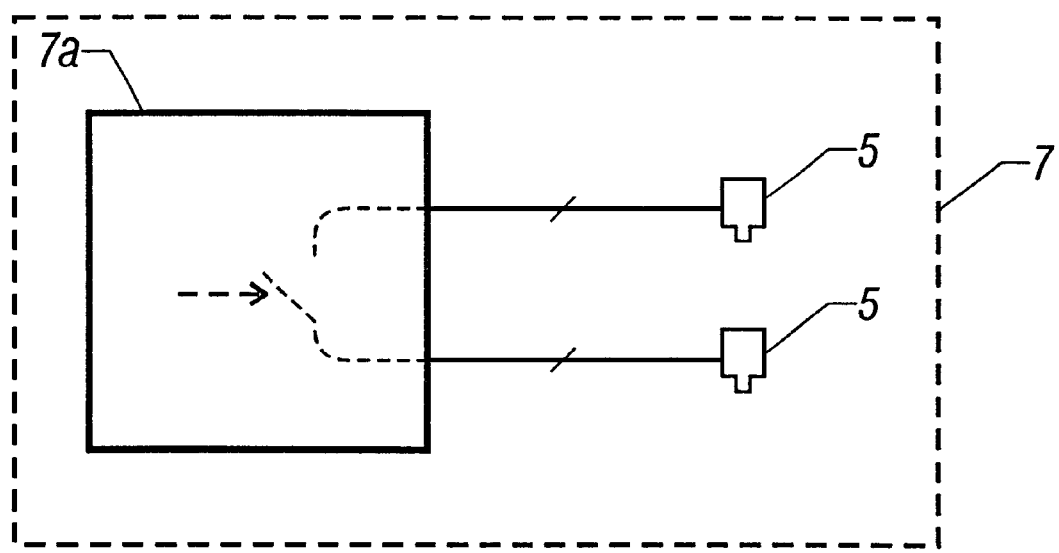
Figure 4A:
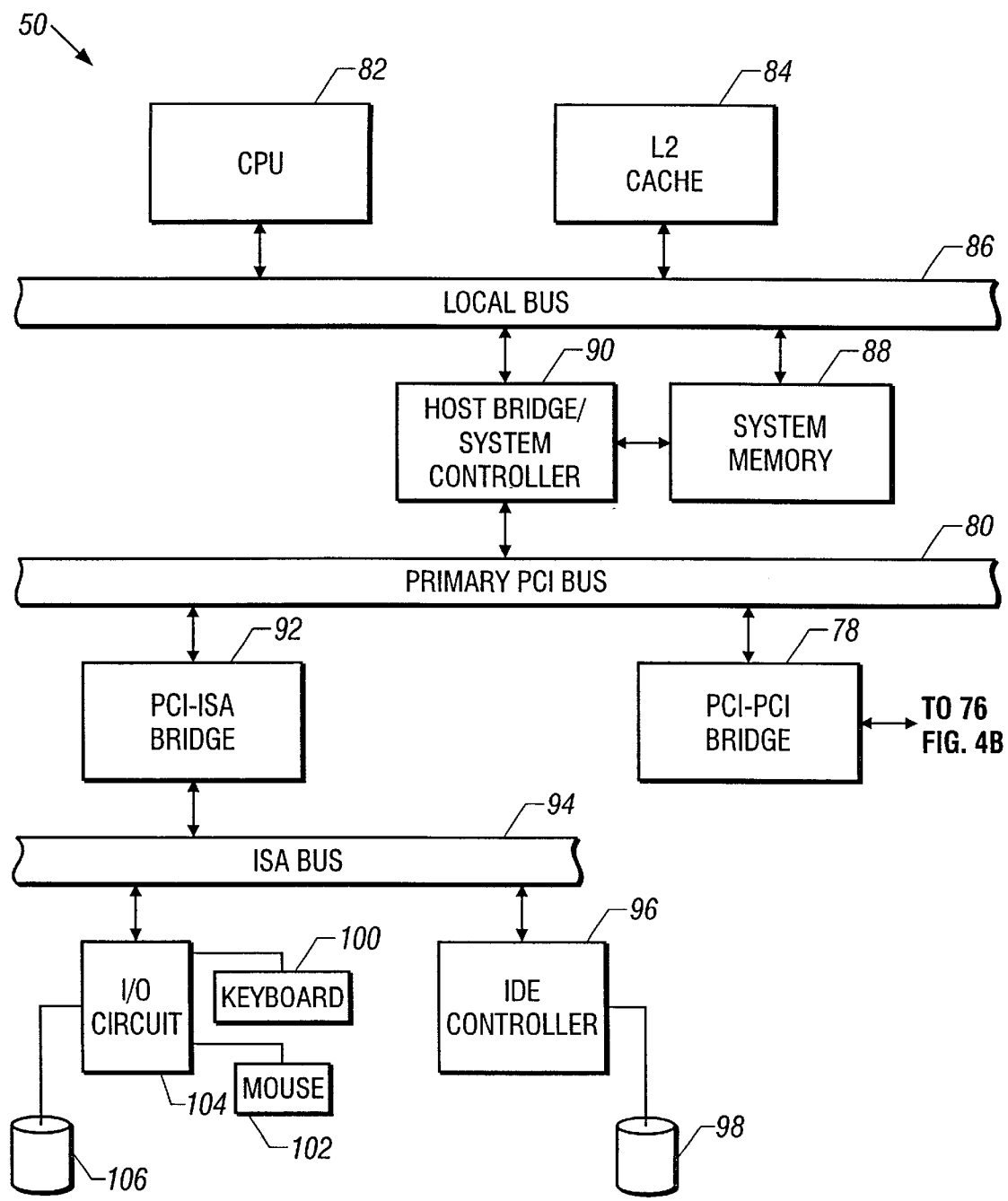
FIG. 4 is an electrical schematic diagram of a computer system.
Figure 4B:
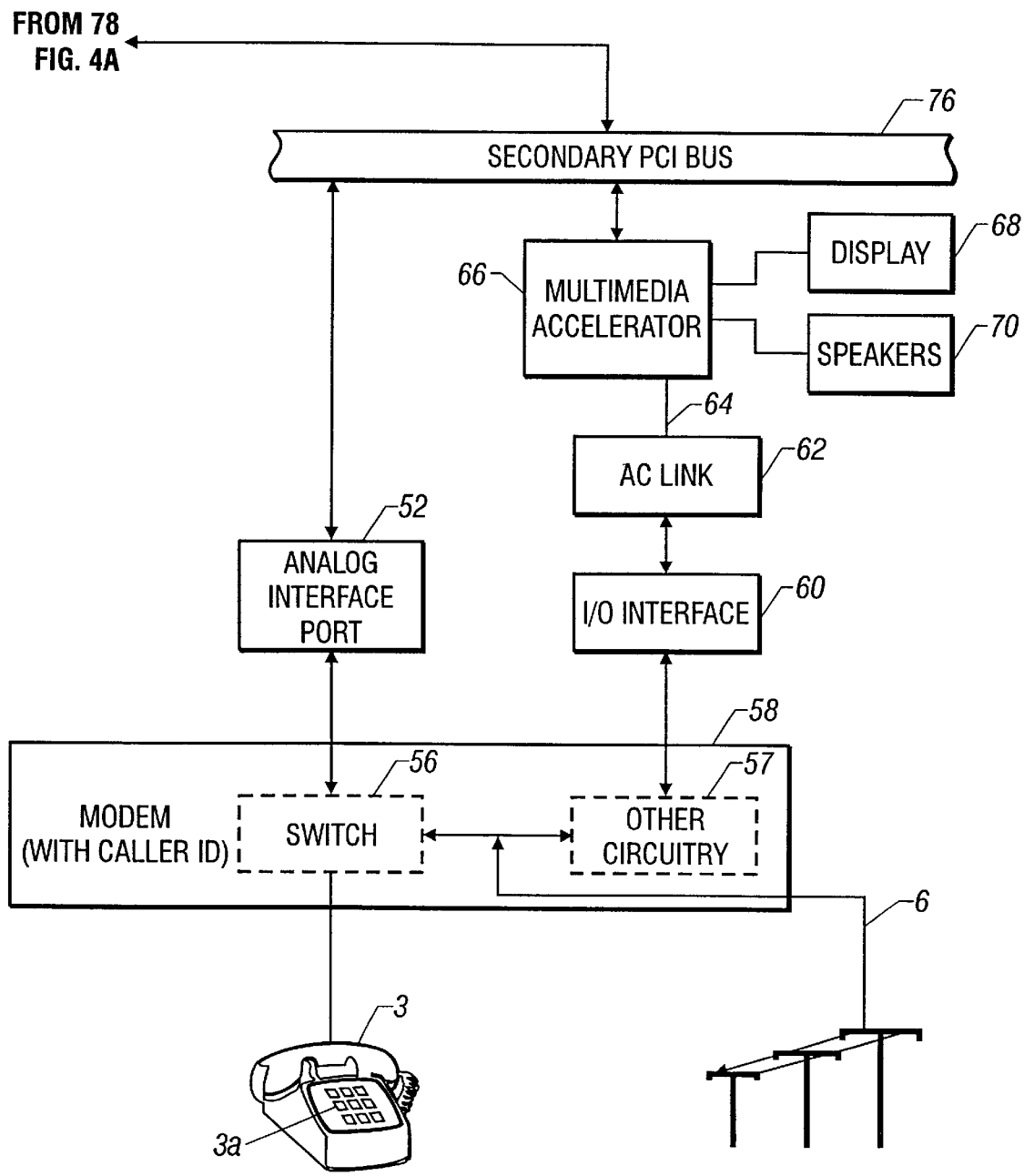

Referring to FIG. 4, a switch circuit 56 of a computer system 50 is configured to connect a telephone 3 (e.g., a desk telephone or a wireless telephone) to either an analog interface port 52 or a telephone line 6 based on commands received from a keypad 3a of the telephone 3. The commands include a CONNECT_TO_PORT command to connect the telephone 3 to the port 52 and a CONNECT_TO_LINE command to connect the telephone 3 to the telephone line 6. Each command is formed by pressing one or more predefined keys of the keypad 3a in a predefined sequence.

When connected to the port 52, the telephone 3 may be used as a peripheral device of the computer system 50, and as such, the key pad 3a may be operated to control functions of and retrieve data from the system 50. For example, the key pad 3a may be used to select routines of a menu driven software program. One of the routines might be, for example, a voice mail retrieval routine that retrieves stored voicemail messages that a modem 58 stored when in a voicemail telephony mode. Continuing the example, once the key pad 3a selects the voicemail retrieval routine, the routine replays the stored messages over the telephone 3.

At powerup and after reset of the computer system 50, the switch circuit 56 connects the telephone 3 to the telephone line 6. However, if the telephone 3 is connected to the port 52, the user may desire to terminate use of the telephone 3 as a peripheral device and reconnect the telephone 3 back to the telephone line 6. To accomplish this, the user uses the key pad 3a to enter the CONNECT_TO_LINE command. The computer system 50 responds to the CONNECT_TO_LINE command by instructing the modem 58 to disconnect the telephone 3 from the port 52 and connect the telephone 3 to the telephone line 6. In this arrangement (which is the arrangement present at power up of the computer system 50), the telephone 3 and the modem 58 are connected in parallel to the telephone line 6.

As is typical, the telephone 3 is configured to generate a unique set of dual tone multi-frequency (DTMF) dial tones for each key of the keypad 3a that is pressed. When the telephone 3 is connected to the telephone line 6 and the telephone 3 goes off-hook, the modem 58 monitors the output of the telephone 3 for the dial tones that represent the predetermined CONNECT_TO_PORT command.

Besides the switch circuit 56, the modem 58 has other circuitry 57 that is configured to detect when a ring occurs on the telephone line 6, to detect the CONNECT_TO_PORT command and to detect when the telephone 3 goes off-hook, a condition necessary for the generation of the dial tones which carry the CONNECT_TO_PORT command.

Figure 5:
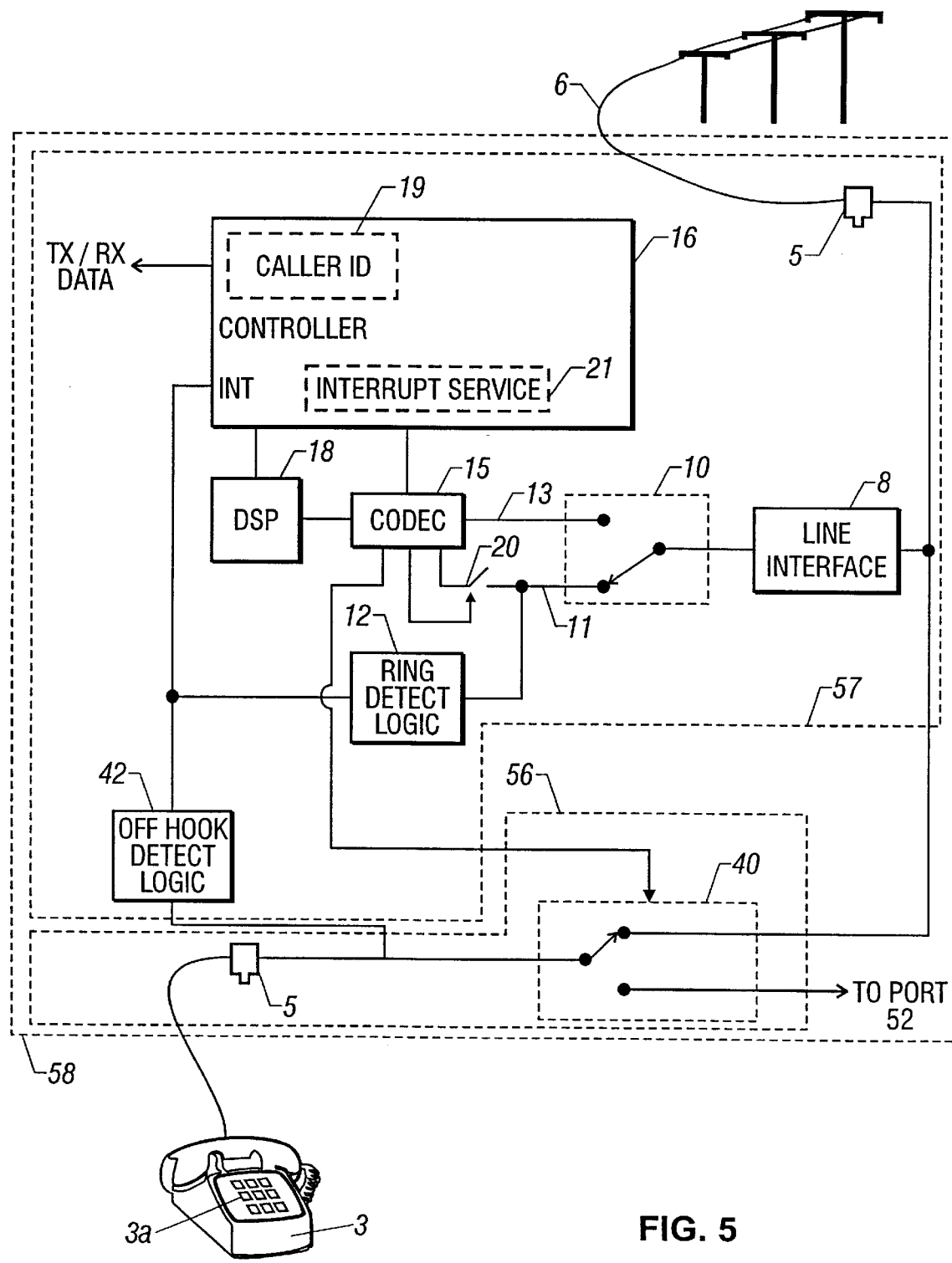
FIG. 5 is a schematic diagram of a modem of the computer system of FIG. 4.
Figure 6:
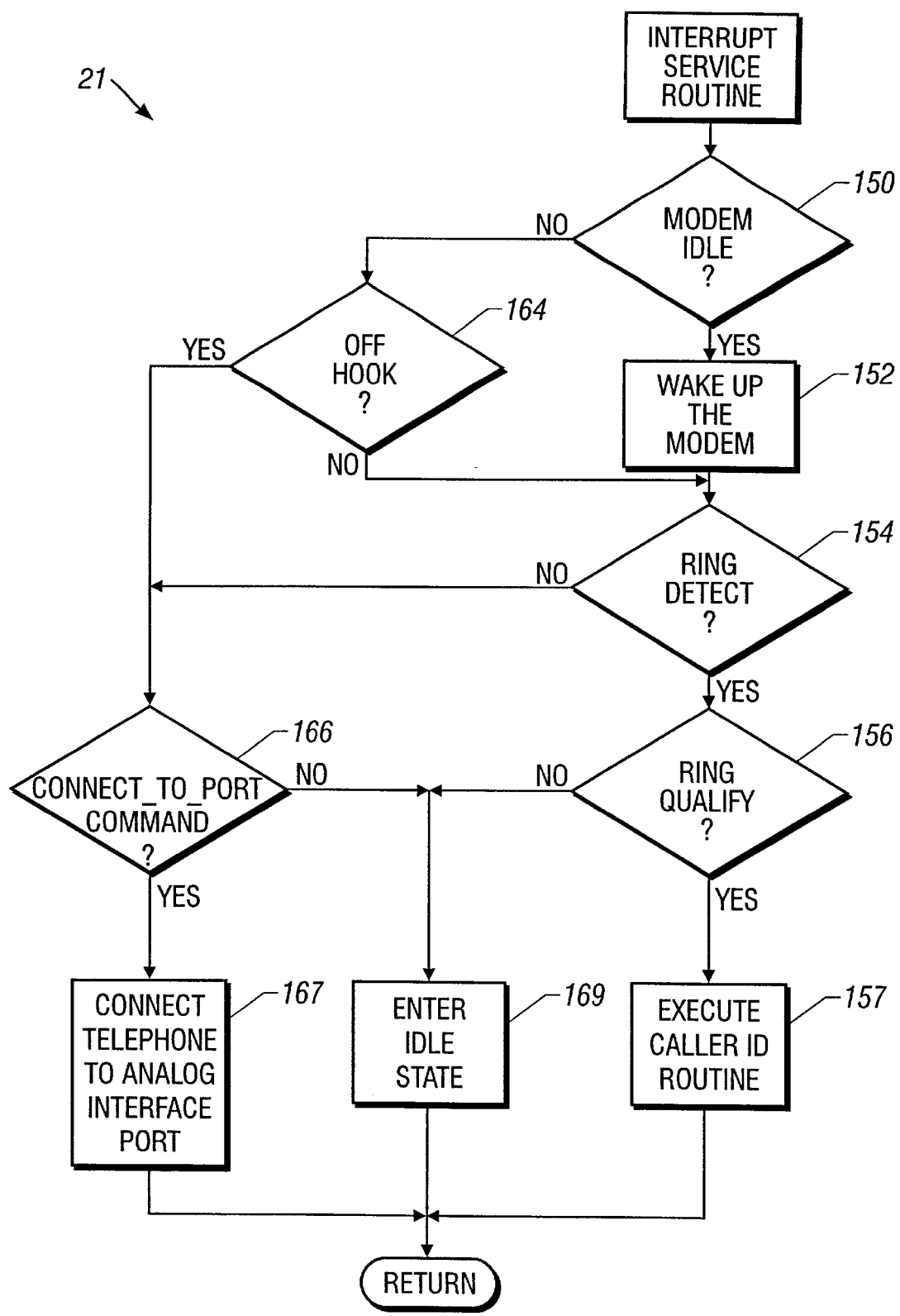
FIG. 6 is a flow diagram of an interrupt service routine.

Referring to FIGS. 5 and 6, the circuitry 57 includes a controller 16 that is alerted at one of its interrupt inputs when either a ring is detected on the telephone line 6 or the telephone 3 goes off-hook. Once alerted, the controller 16 begins executing an interrupt service routine 21 (see FIG. 6). In the routine 21, the controller 16 first wakes up the modem 58 (in steps 150 and 152, if necessary) and determines the condition that generated the interrupt, i.e., the controller determines whether the telephone 3 is off-hook (step 164) or a ring on the telephone line 6 is detected (step 154).

If the telephone 3 is off-hook, the controller 16 determines 166 whether the CONNECT_TO_PORT command has been detected, and if so, the controller 16 (via the switch circuit 56) connects 167 the telephone 3 to the analog interface port 52 and returns from the interrupt service routine 21.

To decode the CONNECT_TO_PORT command, the controller 16 uses a caller ID routine 19. A typical modem with a built-in caller ID routine uses the routine to decode dial tones that are generated by the phone company. These dial tones represent information (e.g., name and phone number) about the calling party.

In addition to using the caller ID routine 19 (along with other circuitry (e.g., a discrete signal processing (DSP) engine 18)) to decode dial tones generated by the phone company, the modem 58 also uses the caller ID function 19 to decode dial tones that are generated by the key pad 3a.

Once a ring on the telephone line 6 is detected (i.e., the telephone 3 is not off-hook), the controller 16 starts executing 157 the caller ID routine 19 to decode information about the calling party. If neither the telephone 3 is off-hook, rings are present on the telephone line 6, nor the CONNECT_TO_PORT command is detected, then the controller 16 returns the modem 58 to the idle state and returns from the interrupt service routine 21.

In FIG. 5, the interrupt input of the controller 16 is connected to the outputs of ring detect logic 12 and off-hook detect logic 42. The off-hook detect logic 42 monitors the output of the telephone 3 and pulses the interrupt input of the controller 16 with an interrupt signal when the telephone 3 goes off-hook. The ring detect logic 12 monitors the telephone line 6 for a ring signal when the telephone line 6 is idle. The ring detect logic 12 is connected to a line 11 that is electrically connected to the telephone line 6 when the modem 58 is not using the telephone line 6 to transmit or receive data.

The controller 16 interacts with the DSP engine 18 to analyze analog waveforms to determine whether the telephone 3 is off-hook or a ring is present on the telephone lines 6. To convert the analog waveforms to digital signals for analysis by the DSP engine 18, the modem 58 has analog-to-digital (A/D) converters which are part of a CODEC chip 15.

Besides having A/D converters, the CODEC chip 15 also has current drivers that the controller 16 uses to operate relays. One of these relays is a relay 40 of the switch circuit 56 that the controller 16 uses to connect the telephone 3 to either the analog interface port 52 or the telephone line 6. Another one of these relays is a caller ID relay 20 that the controller 16 uses to connect the line 11 to the CODEC 15 at the beginning of the interrupt service routine. The controller 16 also uses a driver of the CODEC chip 15 to selectively connect the telephone line 6 to either the CODEC chip 15 (when the modem is transmitting or receiving data over the telephone line 6) or the line 11.

Among the other features of the modem 58 are digital-to-analog (D/A) converters of the CODEC 15. The D/A converters are used to transmit signals from the DSP engine 18 to the telephone line 6. The modem 58 also has an RJ-11 telephone jack 5 that mates with a telephone plug of the telephone line 6. Inside the modem 58, the wires of the jack 5 are connected to the relay 40.

As is typical, the telephone line 6 has wires called tip and ring, and these wires carry the incoming and outgoing analog telephone signals, the ring signal, and the power to operate the telephone 3. The voltages occurring on the telephone line 6 are ordinarily up to 50 volts. As a result, the telephone jack 5 is isolated from other components of the modem 58 through a line interface 8. The interface 8 has an isolation element and a 2-wire to 4-wire converter which takes the tip and rings wires of the jack 5 and converts them to four wires (two for computer system microphone output and two for speaker input) suitable for routing within the computer system 50. Similar to the line interface 8, the analog interface port 52 also has an isolation element and a 2-wire to 4-wire converter. The port 52 also includes A/D and D/A converters.

Referring to back to FIG. 4, the computer system 50 includes a central processing unit (CPU) 82 that is coupled to a local bus 86. The CPU 82 executes software of the computer system 50, such as the menu driven software and a software routine that detects the CONNECT_TO_LINE command and accordingly instructs the modem 58 to connect the telephone 3 to the telephone line 6.

Also coupled to the local bus 86 are a level two (L2) cache, a host bridge/system controller circuit 90, and a system memory 88. The circuit 90 controls access to the system memory 88 and interfaces the local bus 86 to a primary Peripheral Component Interconnect (PCI) bus 80.

A PCI-Industry Standard Architecture (ISA) bridge 92 interfaces the primary PCI bus 80 to an ISA bus 94. Coupled to the ISA bus 94 are an I/O circuit 104 (controlling a floppy disk drive 106, a keyboard 100 and a mouse 102) and an Intelligent Device Electronics (IDE) controller which controls a hard disk drive 98.

A PCI-PCI bridge 78 interfaces the primary PCI bus 80 to a secondary PCI bus 76. Coupled to the bus 76 are the analog interface port 52 and a multimedia accelerator 66. The multimedia accelerator 66 controls data paths going from the bus 76 to a display 68, speakers 70 and a serial interface called an AC link 62. The AC link 62 functions as a two serial link between an I/O interface 60 and the accelerator 66. The I/O interface 60 provides registers, decode logic and other functions for the modem 58.

As examples of the commands entered via the key pad 3a, in some arrangements, the key "#" is pressed to indicate the CONNECT_TO_PORT command, and the key "*" is pressed to indicate the CONNECT_TO_LINE command. In other arrangements, other keys are used to enter the commands. Also, in some arrangements, the same key is used to enter both the CONNECT_TO_PORT and CONNECT_TO_LINE commands. In some arrangements, the command is formed by pressing a predetermined sequence of keys. An example, the CONNECT_TO_LINE command might be formed by pressing the key "*" and then pressing the key "#."

Figure 7:
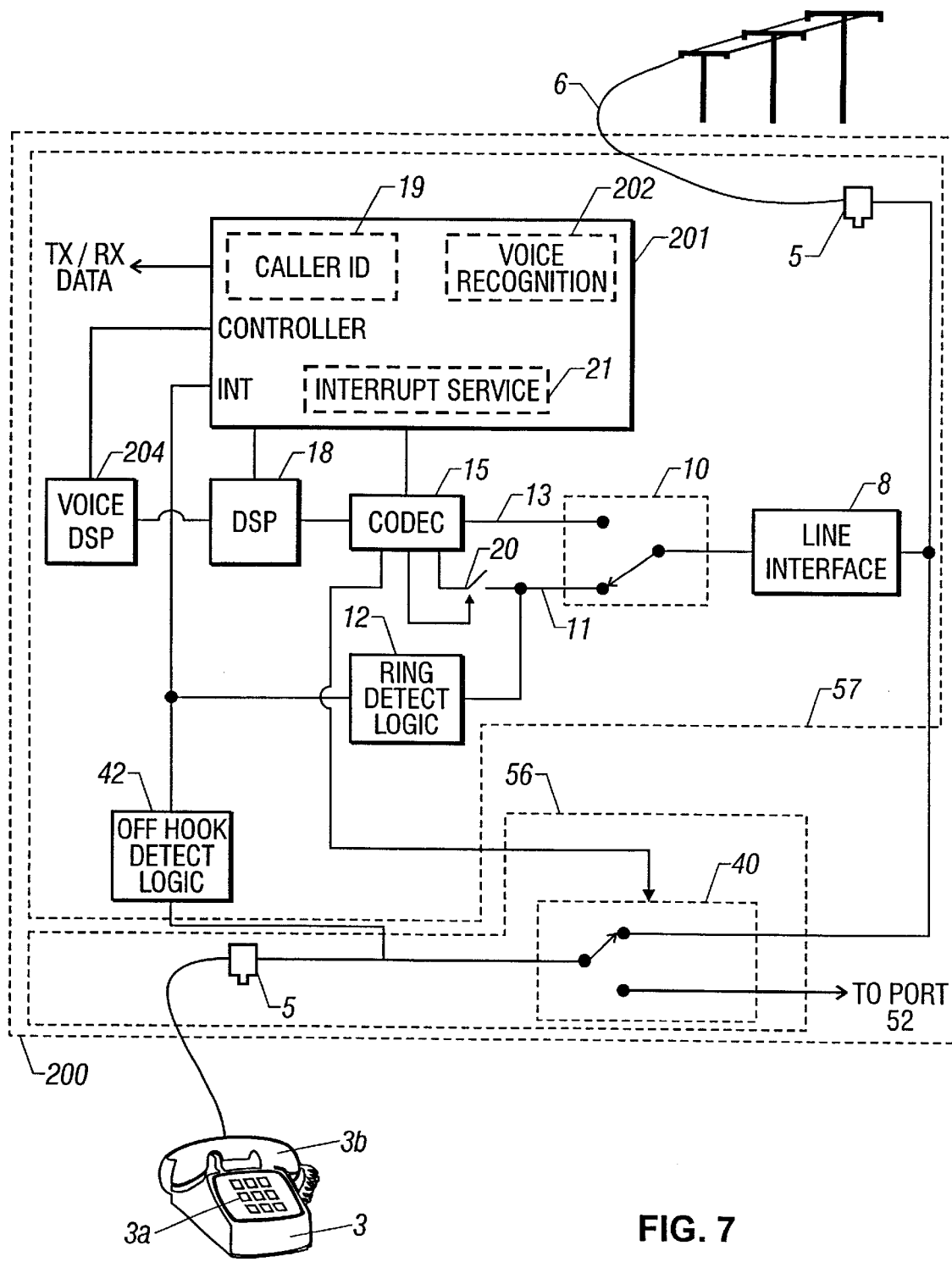
FIG. 7 is a schematic diagram of another modem.

Referring to FIG. 7, in other arrangements, the commands may be generated by a user's voice. In this manner, the user speaks into the telephone 3 to deliver commands to a modem 200. For example, if the user takes the telephone 3 off-hook and says "connect to port" into the telephone 3, the modem 200 is constructed to respond to the voice command and connect the telephone 3 to the analog interface port 52.

The modem 200 has a similar design to the modem 58, with the differences being that the modem 200 has a voice DSP engine 204 and a controller 201 replaces the controller 16. The controller 201 has a similar design to the controller 16 except that the controller 201 has a voice recognition routine 202. The controller 201 uses the voice recognition routine 202 to interact with the voice DSP engine 204 to interpret speech from the telephone 3. The voice recognition routine 202 is activated when the modem 200 detects the telephone 3 has been taken off-hook. The voice DSP engine 204 is coupled to the DSP engine 18.

Other techniques and structures may be used to decode the voice commands. For example, in some arrangements, software executed by the CPU 82 is used to decode the voice commands.

Other embodiments are within the scope of the following claims. For example, a software modem may be used where the functions of the controller 16 are implemented in software executed by the CPU 82.

What is claimed is:

1. A computer system for use with a telephone operable by a user to furnish a predetermined command, comprising:
  a telephony interface port;
  a central processing unit connected to communicate with the telephony interface port; and
  a control circuit connected to the telephone and the telephony interface port and configured to:
    detect the predetermined command, and
    in response to detection of the predetermined command, change a connection status between the telephone and the telephony interface port, wherein the telephone serves as a peripheral device when the telephony interface port is connected to the telephone, the telephone when serving as a peripheral device sends and receives command and data information to and from the central processing unit through the telephony interface port.

2. The computer system of claim 1, wherein the control circuit is configured to change the connection status by connecting the telephone to the telephony interface port.

3. The computer system of claim 1, wherein the control circuit is further configured, in response to detection of the predetermined command, to change another connection status between the telephone and a telephone line.

4. The computer system of claim 3, wherein the control circuit is configured to change said another connection status between the telephone and the telephone line by disconnecting the telephone from the telephone line.

5. the computer system of claim 1, wherein the central processing unit is further connected to:
communicate with the telephony interface port to detect another predetermined command entered by the user via the telephone, and
communicate with the control circuit to change the connection status between the telephone and the telephony interface port in response to detection of said another predetermined command.

6. The computer system of claim 5, wherein the control circuit is configured to change the connection status in response to said another predetermined command by disconnecting the telephone from the telephony interface port.

7. The computer system of claim 5, wherein the predetermined command includes a dial tone provided by the telephone in response to a predetermined key of a keypad of the telephone being pressed.

8. The computer system of claim 1, wherein the predetermined command includes a dial tone provided by the telephone in response to the user speaking into the telephone.

9. The computer system of claim 1, wherein
the telephone is configured to generate a signal indicative of the predetermined command, and
the control circuit includes:
a switch circuit connected to the telephone and the telephony interface port;
a discrete signal processing engine configured to recognize the signal, and
a controller configured to use the switch circuit to connect the telephone to the telephony interface port in response to recognition of the signal by the engine.

10. The computer system of claim 9, wherein the engine and the controller are part of a modem.

11. The computer system of claim 1, wherein at least a portion of the control circuit is part of a modem.

12. The computer system of claim 1, wherein the predetermined command comprises a preselected dual-tone multi-frequency (DTMF) tone.

13. A system for use with a telephone operable by a user to finish a predetermine command, comprising:
a personal computer having a communication port; and
a control circuit connected to the telephone and configured to:
detect the predetermined command, and
in response to detection of the predetermined command, change a connection status between the telephone and the communication port, wherein the telephone serves as a peripheral device when the telephony interface port is connected to the telephone, the telephone when serving as a peripheral device sends and receives command and data information to and from the personal computer through the telephony interface port.

14. The system of claim 13, wherein the control circuit is configured to change the connection status by connecting the telephone to the communication port.

15. The system of claim 13, wherein the control circuit is further configured, in response to detection of the predetermined command, to change another connection status between the telephone and a telephone line.

16. The system of claim 15, wherein the control circuit is configured to change said another connection status between the telephone and the telephone line by disconnecting the telephone from the telephone line.

17. The system of claim 13, wherein the predetermined command includes a dial tone provided by the telephone in response to a predetermined key of a keypad of the telephone being pressed.

18. The system of claim 13, wherein the predetermined command includes a dial tone provided by the telephone in response to the user speaking into the telephone.

19. The system of claim 12, wherein the telephone is configured to generate a signal indicative of the predetermined command, and
the control circuit includes:
a switch circuit connected to the telephone and the telephony interface port;
a discrete signal processing engine configured to recognize the predetermined signal, and
a controller configured to use the switch circuit to connect the telephone to the telephony interface port in response to recognition of the by the engine.

20. The system of claim 19, wherein the engine and the controller are port of a modem.

21. The system of claim 13, wherein at least a portion of the control circuit is part of a modem.

22. The system of claim 13, wherein the communication port comprises an analog interface port.

23. The system of claim 13, wherein the predetermined command comprises a preselected dual-tone multi-frequency (DTMF) tone.

24. A method for use with a personal computer and a telephone capable of operation by a user to furnish a predetermined command, the method comprising;
detecting the predetermined command; and
in response to detection of the predetermined command, changing a connection status between the telephone and the personal computer, wherein the telephone serves as a peripheral device when the telephony interface port is connected to the telephone, the telephone when serving as a peripheral device sends and receives command and data information to and from the personal computer through the telephony interface port.

25. The method of claim 24, wherein the changing comprises connecting the telephone to the computer.

26. The method of claim 24, further comprising in response to detection of the predetermined command, changing a connection status between the telephone and a telephone line.

27. The method of claim 26, wherein the changing the connection status between the telephone and the telephone line comprises disconnecting the telephone from the telephone line.

28. The method of claim 26, wherein the telephone is further operable by the user to furnish another predetermined command, the method further comprising:
detecting said another predetermined command; and
changing the connection status between the telephone and the telephony interface port in response to the detecting of said another predetermined command.

29. The method of claim 28, wherein the changing the connection status between the telephone and the telephony interface port in response to the detecting of said another predetermined command comprises disconnecting the telephone from the telephone line.

30. The method of claim 24 wherein the predetermined command comprises a dial tone.

31. A computer system for use with a telephone operable by a user to furnish a predetermined command, comprising:
a modem configured to:

detect the predetermined command, and operate in response to detection of the predetermined command; and a central processing unit configured to interact with the modem.

32. The computer system of claim 31, wherein the modem is configured to detect by using a caller ID function of the modem.

33. The computer system of claim 31, wherein the modem is configured to operate by changing a connection status of the telephone.

34. A computer system for use with a telephone operable by a user to furnish a predetermined command, comprising:

a modem having a caller ID function, the modem configured to use the caller ID function to detect the predetermined command; and a central processing unit configured to interact with the modem.

35. A method for use with a computer system and a telephone operable by a user to furnish a predetermined command, comprising:

using a modem to detect the predetermined command; and operating the modem in response to detection of the predetermined command from the telephone.

36. The method of claim 35, wherein the using the modem to detect includes using a caller ID function of the modem.

37. The method of claim 35, wherein the operating includes changing a connection status of the telephone.

38. The method of claim 35, wherein the predetermined command comprises a preselected dual tone multi-frequency (DTMF) tone.

39. A method for use with a computer system and a telephone operable by a user to furnish a predetermined command, comprising:

using a caller ID function of the modem to detect the predetermined command.

40. The method of claim 39, wherein the predetermined command comprises a preselected dual tone multi-frequency tone (DTMF).

41. The method of claim 39, further comprising the step of connecting the telephone to an analog interface port of the computer system in response to detection of the predetermined command.

42. A computer system operable with a telephone as a peripheral input/output device, the computer system performing computer functions based on commands from the telephone, the telephone switchable between a peripheral operating mode and a standard operating mode, comprising:

a personal computer comprising:

a processor;

a memory coupled to the processor, the memory comprising a set of instructions which when executed to perform a computer function;

a telephony interface port coupled to the processor to provide analog commands from the telephone directing the processor to execute the set of instructions and analog voice signals; and a switching circuit coupled to the telephone, the computer and a telephone transmission line configured to change a connection status between the telephone and the personal computer and between the telephone and the telephone transmission line, wherein the telephone serves as a peripheral device when the telephony interface port is connected to the telephone, the telephone when serving as a peripheral device sends and receives command and data information to and from the processor through the telephony interface port.

43. The computer system of claim 42, wherein the switching circuit connects the telephone to the personal computer during the peripheral operating mode and connects the telephone to the telephone transmission line during the standard operating mode.

44. The computer system of claim 42, the switching circuit further comprising:

a detection circuit to detect a predetermined command from the telephone; and wherein the connection status is changed upon detection of the predetermined command.

45. The computer system of claim 44, wherein the connection status is changed upon detection of another predetermined command.

46. The computer system of claim 44, wherein the detection circuit is the processor.

47. The computer system of claim 44, wherein the predetermined command includes a dial tone provided by the telephone in response to a predetermined key on the telephone being pressed.

48. The computer system of claim 44, wherein the predetermined command includes a dial tone provided by the telephone in response to a user speaking into the telephone.

49. A peripheral telephone connection to connect a telephone to a computer modem, the telephone directing a personal computer to perform various computer functions in a peripheral operating mode and operating as a standard telephone in a standard operating mode, comprising:

a telephony interface port coupled to the modem configured to receive analog commands from the telephone, the telephony interface port converting the analog commands to signals recognizable by the personal computer; and a switching circuit coupled to the telephone, the personal computer and a telephone transmission line, the switching circuit configured to change a connection status between the telephone and the personal computer and between the telephone and the telephone transmission line, wherein the telephone serves as a peripheral device when the telephony interface port is connected to the telephone, the telephone when serving as a peripheral device sends and receives command and data information to and from the personal computer through the telephony interface port.

50. The peripheral telephone connection of claim 49, wherein the switching circuit connects the telephone to the personal computer during the peripheral operating mode and connects the telephone to the telephone transmission line during the standard operating mode.

51. The peripheral telephone connection of claim 49, the switching circuit further comprising:

a detection circuit to detect a predetermined command from the telephone; and wherein the connection status is changed upon detection of the predetermined command.

52. The peripheral telephone connection of claim 51, wherein the connection status is changed upon detection of another predetermined command.

53. The peripheral telephone connection of claim 51, wherein the predetermined command includes a dial tone provided by the telephone in response to a predetermined key on the telephone being pressed.

54. The peripheral telephone connection of claim 51, wherein the predetermined command includes a dial tone provided by the telephone in response to a user speaking into the telephone.

55. A method for operating a telephone as an input/output device to a personal computer, the personal computer configured to execute computer functions based on commands from the telephone during a peripheral operating mode, the telephone operating as a standard telephone in a standard operating mode, the method comprising:

connecting the telephone to the personal computer in response to a predetermined command, wherein the telephone serves as a peripheral device when the telephony interface port is connected to the telephone, the telephone when serving as a peripheral device sends and receives command and data information to and from the personal computer through the telephony interface port;

executing a set of instructions in response to one or more telephone commands thereby performing a computer function; and connecting the telephone to a telephone transmission line in response to another predetermined command for standard telephone operation.

56. The method of claim 55, wherein the predetermined command includes a dial tone provided by the telephone in response to a predetermined key on the telephone being pressed.

57. The method of claim 55, wherein the predetermined command includes a dial tone provided by the telephone in response to a user speaking into the telephone.

* * * * *

UNITED STATES PATENT AND TRADEMARK OFFICE
CERTIFICATE OF CORRECTION

PATENT NO. : 6,456,715 B1
DATED : September 24, 2002
INVENTOR(S) : Kennedy

It is certified that error appears in the above-identified patent and that said Letters Patent is hereby corrected as shown below:

Column 7,
Line 3, before "computer" delete "the" and insert therefor -- The --.
Line 31, after "recognize the" insert -- predetermined --.
Line 34, after "recognition of the" insert -- predetermined --.

Signed and Sealed this

Twenty-seventh Day of September, 2005

JON W. DUDAS
*Director of the United States Patent and Trademark Office*

UNITED STATES PATENT AND TRADEMARK OFFICE
CERTIFICATE OF CORRECTION

PATENT NO.    : 6,456,715 B1
DATED         : September 24, 2002
INVENTOR(S)   : Kennedy It is certified that error appears in the above-identified patent and that said Letters Patent is hereby corrected as shown below:

<u>Column 7,</u>
Line 3, before "computer" delete "the" and insert therefor -- The --.
Line 31, after "recognize the" insert -- predetermined --.
Line 34, after "recognition of the" insert -- predetermined --.

Signed and Sealed this

Sixth Day of December, 2005

JON W. DUDAS
*Director of the United States Patent and Trademark Office*